United States Patent [19]

Hodge et al.

[11] Patent Number: 4,684,409

[45] Date of Patent: Aug. 4, 1987

[54] SOLVENT SYSTEM COMPRISING N-ALKYL SUBSTITUTED AMIDE AND QUATERNARY AMMONIUM COMPOUND

[75] Inventors: James D. Hodge, Midlothian; Kiu-Seung Lee, Richmond, both of Va.

[73] Assignee: E. I. Du Pont de Nemours and Company, Wilmington, Del.

[21] Appl. No.: 819,595

[22] Filed: Jan. 17, 1986

[51] Int. Cl.$^4$ ............................ C08K 5/16; C08K 5/20
[52] U.S. Cl. .................................. 106/311; 106/287.2; 106/287.25; 106/287.3; 524/602; 528/336; 528/348
[58] Field of Search ................ 106/311, 287.2, 287.25, 106/287.3; 528/336, 348; 524/602

[56] References Cited

U.S. PATENT DOCUMENTS 4,045,417  8/1977  Yamazaki et al. .................. 528/336
4,172,938  10/1979  Mera et al. .......................... 528/336

*Primary Examiner*—Harold D. Anderson

[57] ABSTRACT

A process and its product are disclosed whereby poly-p-phenylene terephthalamide is prepared in a polymerization solvent comprising an N-alkyl-substituted amide, preferably N-methyl-2-pyrrolidone, and a quaternary ammonium chloride, preferably methyl-tri-n-butylammonium chloride.

4 Claims, No Drawings

SOLVENT SYSTEM COMPRISING N-ALKYL SUBSTITUTED AMIDE AND QUATERNARY AMMONIUM COMPOUND

BACKGROUND OF THE INVENTION

1. Field of the Invention

This invention relates to a process for making poly-p-phenylene terephthalamide by a solution polymerization wherein the solvent system comprises an N-alkyl-substituted amide and a quaternary ammonium chloride compound.

2. Description of the Prior Art

Solution polymerization of aromatic diamines with aromatic diacid halides is well known. For example, U.S. Pat. No. 3,063,966 discloses a solution polymerization to yield such aromatic polyamides wherein the solvent medium has, as its primary constituent, an "amide-type" organic compound. Examples of the "amide-type" organic compounds are dimethyl acetamide, tetramethyl urea, N-acetyl pyrrolidone, N-methyl pyrrolidone, and hexamethyl phosphoramide.

U.S. Pat. No. 4,169,982 discloses a solution polymerization to yield poly-p-phenylene terephthalamide and copolymers by use of a solvent medium which can include N-alkyl-substituded amides and salts of alkali or alkaline earth metals. Specific examples of N-alkyl-substituted amides include dimethyl acetamide, N-methyl pyrrolidone, diethyl acetamide, and tetramethyl urea. Specific examples of metal salts include LiCl and $CaCl_2$, among many others.

U.S. Pat. No. 4,308,374 discloses a solution polymerization to yield poly-p-phenylene terephthalamide by use of a solvent system made from N-methyl pyrrolidone and $CaCl_2$ wherein the $CaCl_2$ is present in an amount which is at least 5 percent, by weight, of the weight of the N-methyl pyrrolidone.

SUMMARY OF THE INVENTION

According to this invention there is provided a solvent system comprising certain N-alkyl-substituted amides and certain quaternary ammonium compounds for use in solution polymerization of aromatic polyamides. There is, specifically, provided a polymerization system and a process for making poly-p-phenylene terephthalamide by combining p-phenylene diamine and terephthaloyl chloride in the foregoing solvent system.

DETAILED DESCRIPTION OF THE INVENTION

Because aromatic polyamides, particularly para-oriented aromatic polyamides, are not soluble in most solvents, some difficulty has been encountered, in the past, in finding media in which to conduct solution polymerization of such polymers. The present invention is based on the unexpected improvement provided by certain quaternary ammonium chloride compounds for increasing the solubility of aromatic polyamides in N-alkyl-substituted amide solvents and, thus, avoiding premature precipitation of the growing polymer chains, therein.

By "poly-p-phenylene terephthalamide" is meant the homopolymer resulting from mole-for-mole polymerization of p-phenylene diamine and terephthaloyl chloride and, also, copolymers resulting from incorporation of small amounts of other aromatic diamine with the p-phenylene diamine and of small amounts of other aromatic diacid chloride with the terephthaloyl chloride. Examples of acceptable other aromatic diamines include m-phenylene diamine, 4,4'-diphenyldiamine, 3,3'-diphenyldiamine, 3,4'-diphenyldiamine, 4,4'-oxydiphenyldiamine, 3,3'-oxydiphenyldiamine, 3,4'-oxydiphenyldiamine, 4,4'-sulfonyldiphenyldiamine, 3,3'-sulfonyldiphenyldiamine, 3,4'-sulfonyldiphenyldiamine, and the like. Examples of acceptable other aromatic diacid chlorides include 2,6-naphthalenedicarboxylic acid chloride, isophthaloyl chloride, 4,4'-oxydibenzoyl chloride, 3,3'-oxydibenzoyl chloride, 3,4'-oxydibenzoyl chloride, 4,4'-sulfonyldibenzoyl chloride, 3,3'-sulfonyldibenzoyl chloride, 3,4'-sulfonyldibenzoyl chloride, 4,4'-dibenzoyl chloride, 3,3'-dibenzoyl chloride, 3,4'-dibenzoyl chloride, and the like. As a general rule, other aromatic diamines and other aromatic diacid chlorides can be used in amounts up to as much as about 10 mole percent of the p-phenylene diamine or the terephthaloyl chloride, or perhaps slightly higher, provided only the other diamines and diacid chlorides have no reactive groups which interfere with the polymerization reaction.

The solvent system of this invention is a combination of N-alkyl-substituted amide and quaternary ammonium chloride in which para-phenylene diamine and terephthaloyl chloride can be reacted to yield poly-p-phenylene terephthalamide. The solvent system can be assembled in advance of the polymerization reaction or it can be made up at the time of the polymerization reaction when the polymerizing components are combined. The polymerization system of this invention includes the N-alkyl-substituted amide and the quaternary ammonium chloride of the solvent system and phenylene diamine and terephthaloyl chloride to be polymerized, along with poly-p-phenylene terephthalamide resulting from a mole-for-mole polymerization of some of the diamine with some of the terephthaloyl chloride.

The N-alkyl-substituted amide solvents which can be used in practice of this invention are N-methyl pyrrolidone, dimethyl acetamide, and tetramethyl urea. N-methyl pyrrolidone is preferred. Other N-alkyl-substituted amide solvents may be effective provided that such solvents exhibit sufficient solvent power and sufficient inertness to chemical reactivity. The materials mentioned above have been particularly effective for preparation of poly-p-phenylene terephthalamide.

The quaternary ammonium chlorides which can be used in practice of this invention are methyl tri-n-butyl ammonium chloride, methyl-tri-n-propyl ammonium chloride, tetra-n-propyl ammonium chloride, and tetra-n-butyl ammonium chloride. Methyl tri-n-butyl ammonium chloride is preferred.

The amount of quaternary ammonium chloride to be used in the solvent system for practice of this invention is dependent upon the amount and concentration of polymer to be prepared in the solvent system. While any small amount of quaternary ammonium chloride is believed to provide some of the benefit of the invention, it has been determined that an effective amount of the material is at least about 0.25 moles per mole of diamine reactant in the polymerization. Alternatively, and assuming that the polymerization is usually conducted at final polymer concentration of at least about 3 weight percent based on the total polymerization system, an effective amount of the quaternary ammonium chloride is at least about 1 weight percent of the N-alkyl-substituted amide for preparation of poly-p-phenylene terephthalamide. By "total polymerization system" is meant the total weight of all solvent, salt, polymer, and polymer reactants. Generally, not more than about 3 moles of quaternary ammonium compound per mole of diamine reactant is used in practicing this invention. The final polymer concentration is seldom more than about 15 weight percent based on the total polymerization system; and, therefore, the quaternary ammonium chloride is seldom present in amounts of more than about 100 weight percent based on the N-alkyl-substituted amide. There is no critical upper limit of quaternary ammonium chloride concentration for practice of this invention. The upper limit is merely a matter of practicality in that the quaternary ammonium chlorides are not soluble at concentrations very much above about 90 weight percent based on the N-alkyl-substituted amide and amounts of more than about 3 moles per mole of diamine reactant often result in polymer of relatively low molecular weight. It is believed that maximum polymer molecular weight is obtained at quaternary ammonium chloride concentrations below about 3 moles per mole of diamine. There is little harm in having a higher concentration with undissolved quaternary ammonium compound in the system but undissolved salt provides no benefit. Based on present experience, effective quaternary ammonium chloride concentrations are about 1 to 50 weight percent based on the total polymerization system and preferred concentrations are about 2 to 35 weight percent. For preparation of poly-p-phenylene terephthalamide, effective quaternary ammonium chloride amounts are about 0.25 to 3 moles per mole of the diamine initially in the polymerization system, that is, the diamine to be reacted or already reacted in the polymerization system. Preferred amounts are 0.75 to 2.5.

It has been found to be convenient and useful but not necessary to add a tertiary amine to the solvent system to act as an acid acceptor during the course of the polymerization reaction. It is believed that the tertiary amine binds or otherwise complexes with the hydrochloric acid which is generated as a byproduct of the polymerization in this invention. Because the tertiary amine is useful to react with hydrochloric acid as it is generated and because two moles of acid are generated for every mole of aromatic diamine which is polymerized, it follows from a theoretical viewpoint that two moles of tertiary amine should be used for every mole of diamine to be reacted. It has been found, however, that even a small amount of tertiary amine provides some benefit and that an effective amount is as little as 0.5 mole of tertiary amine per mole of aromatic diamine polymerized or to be polymerized. As a general rule, the tertiary amine, when used, is used in amounts of about one to two moles for each mole of the diamine in the polymerization system. It has been found that there is no harm in using as much as three moles, or more, of tertiary amine for each mole percent diamine in the polymerization system. The tertiary amine acid acceptor is usually used in an amount which is at least 0.5 and not more than 75 weight percent of the N-alkyl-substituted amide. There are few special requirements for the tertiary amine. The tertiary amine need not be completely soluble in the solvent system and need only be chemically stable under the conditions of use. Exemplary tertiary amines include tri-n-butylamine, pyridine, N-methyl pyrrolidine, N,N-diethylaniline, and N,N-dimethylaniline. Tri-n-butylamine is preferred.

The process of the invention can be performed by preparing the solvent system and then adding to the system all of the various additional components for accomplishing the reaction. Of course, the process can, also, be preformed by combining reactant components with separate component parts of the whole solvent system or with portions of the whole solvent system and then combining the parts or portions to bring the reactant components together. The order of combination of components for practice of the invention is not important except that the quaternary ammonium chloride must be present in the solvent system during polymerization of the reactive components to assist in polymerization to the desired high molecular weight.

In preferred practice of the invention, the usual procedure for combining the p-phenylene diamine with the terephthaloyl chloride is by adding finely-divided terephthaloyl chloride powder or terephthaloyl chloride melt, with vigorous agitation, to a solution of p-phenylene diamine and a tertiary amine in the solvent system. The resulting poly-p-phenylene terephthalamide is separated from the solvent system by adding a nonsolvent for the polymer, such as water or dilute aqueous alkali to the mass under continued, vigorous, agitation. The solid polymer product can then be separated from the liquid of the system by filtration. The polymer product can be purified by repeated washings in water or dilute aqueous alkali.

The process of this invention is generally conducted at temperatures below 100° C. and under conditions of vigorous agitation. Combination of the reactant components causes generation of considerable heat and the agitation, also, results in generation of heat energy. For that reason, the solvent system and other materials are cooled at all times during the process when cooling is necessary to maintain the desired temperature. The process is usually conducted within the range of 0° to 100° C., although a temperature of above 100° and below 0° C. can be used.

It is believed that the polymerization reaction is substantially complete very quickly, perhaps within 30 seconds or a minute. In order to assure the highest molecular weight, however, the agitation is usually continued for a longer time, sometimes as much as 30 minutes or perhaps longer. The agitation is also useful for crumbling the final polymer product in the solvent system.

The degree of polymerization between coreactants and the resulting molecular weight of the polymer made using this invention, are affected by a multitude of conditions such as reaction temperatures and concentrations of known reactant materials. Such conditions and the control of such conditions are well known in altering or optimizing the polymerization reaction and the resulting polymer molecular weight. Reactants should be substantially free from impurities, as should the polymerization medium. The solvent system should have less than about 0.02 weight percent water, if high molecular weight polymer is desired.

An indication of the molecular weight of the polymer made using this invention is provided by determining the inherent viscosity of the polymer (IV). The inherent viscosity is defined as: $IV = \ln(\eta_{rel})/c$ wherein c is the concentration of dissolved polymer in grams of polymer per deciliter of solvent and $\eta_{rel}$ is the time of flow of that solution through a capillary viscometer divided by the time of flow of the pure solvent through the same capillary viscometer. For the purpose of describing this invention, the concentration is 0.5, the solvent is 95–98% (concentrated) sulfuric acid, and the test is conducted at 25° C. Preferred polymer product for purposes of this invention exhibits an inherent viscosity of at least 2.5, and an inherent viscosity of greater than 4 is more preferred.

The solvent system of this invention includes quaternary ammonium chloride salt and N-alkyl-substituted amide liquid, both of which can be easily extracted and recovered from the polymerization system using low-boiling organic solvents. This solvent system, with use of the quaternary ammonium chloride, represents a substantial improvement over systems using the inorganic salts of the prior art because, for one reason, recovery of the salt and the organic liquid of the solvent system of this invention can be accomplished simultaneously by a single solvent extraction process.

Shaped articles made from polymers prepared by means of this invention exhibit high strength and high temperature performance qualities. In particular, the poly-p-phenylene terephthalamide made by means of this invention is especially suited for making films and fibers of high strength and high modulus. Fibuers and yarns from fibers can be made by spinning solutions of the polymer in sulfuric acid having a concentration of greater than 98% using any of the presently-known spinning methods. Yarns and fibers thus made are particularly useful in textiles for reinforcement or protection, such as in garments of protective fabric and composites strengthened by such materials. Polymers prepared by means of this invention also find use as reinforcement in tires, friction products, packing materials, and the like.

PREFERRED EMBODIMENTS OF THE INVENTION

The invention is further described in the following examples. All percentages mentioned in the examples are based on the total weight of the polymerization system unless otherwise stated.

EXAMPLE 1

Preparation of a solvent premix system was completed as follows: Into a flask equipped for vacuum distillation were charged 756 g and 614 additional milliliters of N-methyl-2-pyrrolidone and 344 g 75 weight percent aqueous methyl tri-n-butyl ammonium chloride. The mixture was distilled at 5–10 mm Hg until 700 milliliters of distillate were collected and the water content of the remaining mixture was determined. The mixture was replenished with 700 milliliters of N-methyl-2-pyrrolidone and 700 milliliters of liquid was, again, distilled off. This was repeated to reduce the water content in the remaining solution to less than 200 parts per million (ppm). In fact, in this example the water content of the final solvent system was 120 ppm. The solvent premix system of this example consisted essentially of 756 g of N-methyl-2-pyrrolidone and 258 g (1.10 moles) of methyl tri-n-butyl ammonium chloride—25.4% methyl tri-n-butyl ammonium chloride based on the weight of the solvent premix system.

To make poly-p-phenylene terephthalamide, a vessel equipped for agitation, cooling, and nitrogen flush was charged with: 120 g of the above solvent system, 9.329 g (0.0863 mole) p-phenylene diamine (PPD), 19.0 g (0.102 mole) tri-n-butyl amine, and 21.0 g of additional N-methyl-2-pyrrolidone. The mixture was stirred until the p-phenylene diamine was completely dissolved and the resulting solution was cooled to 5° C. With continued cooling at about 5° C. and vigorous agitation, a first addition of 6.145 g (0.0303) mole of powdered terephthaloyl chloride (TCl) was added at once and was vigorously stirred for about 5 minutes. The cooling was then removed and a second addition of 11.413 g (0.0562 mole) of powdered terephthaloyl chloride was added at once and was vigorously stirred for about 20 minutes. The mole ratio of methyl-tri-n-butyl ammonium chloride to p-phenylene diamine was 1.51.

The resulting mass was combined, under vigorous agitation, in a four-liter vessel with about 500 milliliters of water and was filtered and washed three more times with water before drying the resulting polymer for about 16 hours at 70° C. in a vacuum oven.

The inherent viscosity for the polymer of this example was determined to be 9.35. The inherent viscosity of the resulting polymer may vary slightly from run-to-run in laboratory experiments because the several factors which affect polymer molecular weight are difficult to control in small runs.

As a comparison, the polymerization of this Example was run, using the same conditions and materials, and the same amounts of materials except that no quaternary ammonium chloride was added. The resulting polymer had an inherent viscosity of 0.41. By omitting the tri-n-butyl amine, a polymer with inherent viscosity of 0.52 was prepared. By replacing the N-methyl-2-pyrrolidone with dimethyl acetamide, a polymer with inherent viscosity of 0.31 was prepared; and with tetramethyl urea, the resulting polymer had an inherent viscosity of 0.35.

EXAMPLE 2

This example demonstrates the effect of a change in the amount of quaternary ammonium chloride on the polymer inherent viscosity. The same materials and procedures were used in this example as were used in Example 1 except that the amounts were altered as indicated in the Table 1, below. Also, in Run number 2s, only 6.997 g PPD were used and only 4.609 g and 8.560 g of TCl were used in the first and second additions, respectively.

TABLE 1

| Run # | NMP—MTBAC Premix (g) | Added NMP* (g) | TBA (g) | % polymer | MTBAC PPD** | TBA/PPD*** | Inherent Viscosity |
|---|---|---|---|---|---|---|---|
| 2a | 20 | 140 | 0 | 11 | 0.25 | 0 | 1.10 |
| 2b | 40 | 120 | 0 | 11 | 0.50 | 0 | 1.31 |
| 2c | 60 | 100 | 0 | 11 | 0.75 | 0 | 1.87 |
| 2d | 80 | 80 | 0 | 11 | 1.00 | 0 | 2.71 |
| 2e | 100 | 60 | 0 | 11 | 1.25 | 0 | 4.44 |
| 2f | 120 | 40 | 0 | 11 | 1.50 | 0 | 4.68 |
| 2g | 140 | 20 | 0 | 11 | 1.75 | 0 | 3.61 |
| 2h | 160 | 0 | 0 | 11 | 2.00 | 0 | 3.05 |
| 2i | 20 | 121 | 19.0 | 11 | 0.25 | 1.2 | 2.63 |
| 2j | 40 | 101 | 19.0 | 11 | 0.50 | 1.2 | 2.93 |
| 2k | 60 | 81 | 19.0 | 11 | 0.75 | 1.2 | 4.86 |

TABLE 1-continued

| Run # | NMP—MTBAC Premix (g) | Added NMP* (g) | TBA (g) | % polymer | MTBAC PPD** | TBA/ PPD*** | Inherent Viscosity |
|---|---|---|---|---|---|---|---|
| 2l | 80 | 61 | 19.0 | 11 | 1.00 | 1.2 | 5.36 |
| 2m | 100 | 41 | 19.0 | 11 | 1.25 | 1.2 | 7.52 |
| 2n | 120 | 21 | 19.0 | 11 | 1.50 | 1.2 | 9.35 |
| 2o | 141 | 0 | 19.0 | 11 | 1.76 | 1.2 | 5.80 |
| 2p | 160 | 0 | 19.2 | 10 | 2.00 | 1.2 | 4.63 |
| 2q | 120 | 91.3 | 19.2 | 8 | 1.50 | 1.2 | 8.47 |
| 2r | 160 | 51.3 | 19.2 | 8 | 2.00 | 1.2 | 8.32 |
| 2s | 158.5 | 0 | 14.4 | 8 | 2.63 | 1.2 | 3.05 |

*NMP: N—methyl pyrrolidone
**MTBAC/PPD: methyltri-n-butyl ammonium chloride/p-phenylene diamine - mole ratio
***TBA/PPD: tri-n-butyl amine/p-phenylene diamine - mole ratio

EXAMPLE 3

This example demonstrates the effect of the use of different tertiary amine acid acceptors on the polymer inherent viscosity. The same materials and procedures were used in this example as were used in Example 1 except that the kinds and amounts of tertiary amines were changed as indicated in Table 2, below. Data from Example 1 and Example 2, Run 2f are included in the Table 2 for comparison.

TABLE 2

| Run # | Tertiary Amine | Tertiary Amine (g) | Amine/ PPD* | Inherent Viscosity |
|---|---|---|---|---|
| 1 | tri-n-butyl amine | 19.0 | 1.2 | 9.35 |
| 2f | None | — | 0 | 4.68 |
| 3a | pyridine | 8.2 | 1.2 | 5.70 |
| 3b | N,N—dimethyl- aniline | 12.6 | 1.2 | 6.63 |
| 3c | N,N—diethyl- aniline | 15.5 | 1.2 | 7.89 |

*Tertiary Amine/p-phenylene diamine - molar ratio

EXAMPLE 4

This example demonstrates use of N,N-dimethylacetamide as the N-alkyl-substituted amide of the solvent system. To make the solvent premix system, the same procedure was followed and the same kinds and amounts of materials were used in this example as were used in Example 1 except that 756 g and 614 additional milliliters of dimethylacetamide were used instead of the N-methyl pyrrolidone. In this example, it was necessary to repeat the distillation of the 700 milliliters of solvent three times to remove water from the solvent system. The final water content was 77 ppm.

The resulting solvent premix system of this example consisted essentially of 756 g of the dimethyl acetamide and 258 g of methyl tri-n-butyl ammonium chloride—25.4% methyl tri-n-butyl ammonium chloride based on the weight of the solvent premix system.

Poly-p-phenylene terephthalamide was prepared in the same way as in Examples 1 and 2 except that the solvent system of this example was used and the amounts of the various components are shown in Table 3 below. Also, in Runs numbered 4h and 4i, only 6.785g PPD were used and only 4.470 g and 8.300 g of TCl were used in the first and second additions, respectively; and in Runs numbered 4j through 4p, only 5.088 g PPD were used and only 3.352 g and 6.224 g of TCl were used in the first and second additions, respectively.

TABLE 3

| Run # | DMAC—MTBAC Premix (g) | Added DMAC* (g) | TBA (g) | % polymer | MTBAC/ PPD | TBA/ PPD | Inherent Viscosity |
|---|---|---|---|---|---|---|---|
| 4a | 80 | 80 | 0 | 11 | 1.00 | 0 | 1.52 |
| 4b | 100 | 60 | 0 | 11 | 1.25 | 0 | 3.34 |
| 4c | 120 | 40 | 0 | 11 | 1.50 | 0 | 3.35 |
| 4d | 140 | 20 | 0 | 11 | 1.75 | 0 | 2.31 |
| 4e | 160 | 0 | 0 | 11 | 2.00 | 0 | 3.29 |
| 4f | 100 | 40.8 | 19.2 | 11 | 1.25 | 1.2 | 3.67 |
| 4g | 120 | 20.8 | 19.2 | 11 | 1.50 | 1.2 | 4.54 |
| 4h | 87.3 | 80 | 0 | 8 | 1.50 | 0 | 4.71 |
| 4i | 87.3 | 66 | 14.0 | 8 | 1.50 | 1.2 | 4.42 |
| 4j | 43.7 | 118 | 10.5 | 6 | 1.00 | 1.2 | 5.97 |
| 4k | 54.6 | 107.1 | 10.5 | 6 | 1.25 | 1.2 | 6.47 |
| 4l | 65.5 | 96.2 | 10.5 | 6 | 1.50 | 1.2 | 6.66 |
| 4m | 65.5 | 97.9 | 8.8 | 6 | 1.50 | 1.0 | 6.95 |
| 4n | 65.5 | 100.6 | 6.1 | 6 | 1.50 | 0.7 | 5.32 |
| 4o | 65.5 | 92.7 | 14.0 | 6 | 1.50 | 1.6 | 5.89 |
| 4p | 65.5 | 106.7 | 0 | 6 | 1.50 | 0 | 3.99 |

*DMAC: dimethyl acetamide

EXAMPLE 5

This example demonstrates the use of N,N,N,N-tetramethylurea as the N-alkyl-substituted amide of the solvent system. To make the solvent system, the same procedure was followed and the same kinds and amounts of materials were used as in Example 1 except that 756 g and 614 additional milliliters of the tetramethylurea were used instead of the N-methyl pyrrolidone. In this example, it was necessary to repeat the distillation of the 700 milliliters of solvent 3 times to remove water from the solvent system. The final water content was 46 ppm.

The solvent premix system of this example was 25.4 weight methyl-tri-n-butyl ammonium chloride in N,N,N,N-tetramethylurea based on the weight of the solvent premix system.

Poly-p-phenylene terephthalamide was prepared in the same way as in Example 1 except that the solvent system of this example was used and the amounts of the various components are shown in Table 4 below. Also, in Runs numbered 5d and 5e, only 6,484 g PPD were used and only 4.271 g and 7.932 g of TCl were used in the first and second additions, respectively; and in Runs 5f and 5g, only 4.725 g PPD were used and only 3.113 g and 5.781 g TCl were used in the first and second additions, respectively.

TABLE 4

| Run # | TMU—MTBAC Premix (g) | Added TMU* (g) | TBA (g) | % polymer | MTBAC/PPD | TBA/PPD | Inherent Viscosity |
|---|---|---|---|---|---|---|---|
| 5a | 80 | 61 | 19.0 | 11 | 1.00 | 1.2 | 2.82 |
| 5b | 100 | 41 | 19.0 | 11 | 1.25 | 1.2 | 3.29 |
| 5c | 120 | 21 | 19.0 | 11 | 1.50 | 1.2 | 2.62 |
| 5d | 69.4 | 77.3 | 13.3 | 8 | 1.25 | 1.2 | 3.67 |
| 5e | 83.4 | 63.3 | 13.3 | 8 | 1.50 | 1.2 | 3.79 |
| 5f | 50.6 | 99.7 | 9.7 | 6 | 1.25 | 1.2 | 4.36 |
| 5g | 60.8 | 89.5 | 9.7 | 6 | 1.50 | 1.2 | 4.63 |

*TMU: N,N,N,N—tetramethylurea

EXAMPLE 6

This example demonstrates the use of tetra-n-propylammonium chloride. Preparation of a solvent premix system using tetra-n-propylammonium chloride was completed as follows: Into a flask equipped for vacuum distillation were charged 756 g and 2000 additional milliliters of N-methyl-2-pyrrolidone and 480 g 38 weight percent aqueous tetra-n-propylammonium chloride. The mixture was distilled at 5–10 mm Hg until 2297 milliliters of distillate were collected and the water content of the remaining mixture was determined. The mixture was replenished with 2000 milliliters of N-methyl-2-pyrrolidone and 2000 milliliters were, again, distilled off. The resulting water content was 115 ppm. The solvent premix system of this example was 19.4 weight percent tetra-n-propylammonium chloride in N-methyl-2-pyrrolidone based on the weight of the solvent premix system.

Poly-p-phenylene terephthalamide was prepared in the same way as in Example 1 except that the solvent premix system of this example was used and the amounts of the various components are shown in Table 5, below. Also, in Runs numbered 6d and 6e, only 6.484 g PPD were used and only 4.271 g and 7.932 g TCl were used in the first and second additions, respectively; and, in Runs numbered 6f and 6g, only 4.725 g PPD were used and only 3.113 g and 5.781 g TCl were used in the first and second additions, respectively.

TABLE 5

| Run # | NMP—TPAC* Premix (g) | Added NMP (g) | TBA (g) | % polymer | TPAC/PPD | TBA/PPD | Inherent Viscosity |
|---|---|---|---|---|---|---|---|
| 6a | 98.4 | 42.6 | 19.0 | 11 | 1.00 | 1.2 | 4.33 |
| 6b | 123.0 | 18.0 | 19.0 | 11 | 1.25 | 1.2 | 5.01 |
| 6c | 147.6 | 0 | 19.0 | 11 | 1.50 | 1.2 | 3.18 |
| 6d | 85.5 | 61.2 | 13.3 | 8 | 1.25 | 1.2 | 4.92 |
| 6e | 102.6 | 44.1 | 13.3 | 8 | 1.50 | 1.2 | 6.21 |
| 6f | 62.3 | 88.0 | 9.7 | 6 | 1.25 | 1.2 | 5.68 |
| 6g | 74.8 | 75.5 | 9.7 | 6 | 1.50 | 1.2 | 6.46 |

*TPAC: tetra-n-propylammonium chloride.

It should be noted that solid particles of TPAC were present in the polymerization system in all of the runs for this example.

EXAMPLE 7

This example demonstrates preparation of poly-p-phenylene terephthalamide having m-phenylene diamine incorporated therein to yield a copolymer. The copolymer was made using, as the diamine, 90 mole percent p-phenylene diamine and 10 mole percent m-phenylene diamine. The solvent premix system of this example was the same as the solvent premix system of Example 1.

Poly-p/m (90/10)-phenylene terephthalamide was prepared in the same way as poly-p-phenylene terephthalamide in Example 1 except that 8.396 g p-phenylenediamine and 0.933 g m-phenylenediamine were used instead of p-phenylenediamine only. Amounts of the various components are shown in Table 6, below.

TABLE 6

| Run # | NMP—MTBAC Premix (g) | Added NMP (g) | TBA (g) | % polymer | MTBAC/*PPD + MPD | TBA/PPD + MPD | Inherent Viscosity |
|---|---|---|---|---|---|---|---|
| 7a | 40 | 120 | 0 | 11 | 0.50 | 0 | 1.48 |
| 7b | 80 | 80 | 0 | 11 | 1.00 | 0 | 3.20 |
| 7c | 120 | 40 | 0 | 11 | 1.50 | 0 | 4.03 |
| 7d | 40 | 120 | 19.2 | 10 | 0.50 | 1.2 | 4.20 |
| 7e | 80 | 80 | 19.2 | 10 | 1.00 | 1.2 | 5.46 |
| 7f | 120 | 40 | 19.2 | 10 | 1.50 | 1.2 | 5.78 |

*MTBAC/PPD + MPD: methyltri-n-butylammonium chloride/p-phenylenediamine + m-phenylenediamine - mole ratio.

EXAMPLE 8

This example demonstrates the use of tetra-n-butylammonium chloride. Preparation of a solvent premix system using tetra-n-butylammonium chloride was completed as follows: Into a flask equipped for vacuum distillation were charged 756 g and 614 additional milliliters of N-methyl-2-pyrrolidone and 344 g 75 weight percent aqueous tetra-n-butylammonium chloride. The mixture was distilled at 5–10 mm Hg until 700 milliliters of distillate were collected and the water content of the mixture was determined. The mixture was replenished with 700 milliters of N-methyl-2-pyrrolidone and 700 milliliters were, again, distilled off. This procedure was repeated 3 times and the water content of solvent premix system was 87 ppm.

Poly-p-phenylene terephthalamide was prepared in the same way as in Example 1 except that the solvent premix system of this example was used; and the amounts of the various components used, are shown in Table 7, below. Also, in Runs numbered 8d and 8e, only 6.484 g PPD were used and only 4.271 g and 7.932 g TCl were used in the first and second additions, respectively; and, in Runs numbered 8f and 8g, only 4.725 g PPD were used and only 3.113 g and 5.781 g TCl were used in the first and second additions, respectively.

TABLE 7

| Run # | NMP–TBAC* Premix (g) | Added NMP (g) | TBA (g) | % polymer | TBAC/PPD | TBA/PPD | Inherent Viscosity |
|---|---|---|---|---|---|---|---|
| 8a | 94.2 | 46.8 | 19.0 | 11 | 1.00 | 1.2 | 1.88 |
| 8b | 117.8 | 23.2 | 19.0 | 11 | 1.25 | 1.2 | 1.74 |
| 8c | 141.0 | 0 | 19.0 | 11 | 1.50 | 1.2 | 3.90 |
| 8d | 81.9 | 64.8 | 13.3 | 8 | 1.25 | 1.2 | 1.75 |
| 8e | 98.2 | 48.5 | 13.3 | 8 | 1.50 | 1.2 | 2.63 |
| 8f | 59.7 | 90.6 | 9.7 | 6 | 1.25 | 1.2 | 2.41 |
| 8g | 71.6 | 78.7 | 9.7 | 6 | 1.50 | 1.2 | 5.02 |

*TBAC: tetra-n-butylammonium chloride.
It should be noted that solid particles of TBAC were present in the polymerization system in all of the runs for this example.

EXAMPLE 9

This example demonstrates the use of methyl tri-n-propyl ammonium chloride. Preparation of a solvent premix system using methyl tri-n-propyl ammonium chloride was completed as follows: Into a flask equipped for vacuum distillation were charged 3700 g N-methyl-2-pyrrolidone and 1060 g 50 weight percent aqueous methyl tri-n-propyl ammonium chloride. The mixture was distilled at 5–20 mm Hg until 2200 milliliters of N-methyl-2-pyrrolidone were collected.

The mixture was diluted with 1000 milliliters of N-methyl-2-pyrrolidone and, this time, 600 milliliters were distilled off. The resulting solvent premix was 18.2 weight percent methyl tri-n-propyl ammonium chloride in N-methyl-2-pyrrolidone, based on the weight of the solvent premix system.

Poly-p-phenylene terephthalamide was prepared in the same way as in Example 1 except that the solvent system of this example was used and the amounts of the various components are shown in Table 8 below.

TABLE 8

| Run # | NMP–MTPAC* Premix (g) | Added NMP (g) | TBA (g) | % polymer | MTPAC/PPD | TBA/PPD | Inherent Viscosity |
|---|---|---|---|---|---|---|---|
| 9a | 73.1 | 67.7 | 19.2 | 11 | 0.80 | 1.2 | 6.36 |
| 9b | 91.4 | 49.4 | 19.2 | 11 | 1.00 | 1.2 | 7.22 |
| 9c | 114.3 | 26.5 | 19.2 | 11 | 1.25 | 1.2 | 8.58 |
| 9d | 137.0 | 3.8 | 19.2 | 11 | 1.50 | 1.2 | 7.83 |
| 9e | 160.0 | 0.8 | 19.2 | 11 | 1.75 | 1.2 | 6.99 |
| 9f | 137.0 | 10.2 | 12.8 | 11 | 1.50 | 0.8 | 7.36 |
| 9g | 137.0 | 7.0 | 16.0 | 11 | 1.50 | 1.0 | 9.47 |
| 9h | 137.0 | 0 | 22.4 | 11 | 1.50 | 1.6 | 6.48 |

*MTPAC: methyl tri-n-propylammonium chloride

What is claimed is:

1. A solvent system for use in solution polymerization of aromatic polyamides comprising: (a) an N-alkyl-substituted amide selected from the group consisting of N-methyl pyrrolidone, dimethyl acetamide, and tetramethyl urea and (b) an effective amount of a quaternary ammonium compound selected from the group consisting of methyl tri-n-butylammonium chloride, methyl tri-n-propyl ammonium chloride, tetra-n-butylammonium chloride, and tetra-n-propyl ammonium chloride.

2. The solvent system of claim 1 wherein the quaternary ammonium chloride is present in an amount which is at least 1 weight percent of the N-alkyl-substituted amide.

3. The solvent system of claim 1 wherein the quaternary ammonium chloride is present in the amount which is from 1 to 100 weight percent of the N-alkyl-substituted amide.

4. The solvent system of claim 1 additionally comprising, (c) a tertiary amine acid acceptor in an amount which is from 0.5 to 75 weight percent of the N-alkyl-substituted amide.

* * * * *